(12) United States Patent  
Vestal

(10) Patent No.: US 9,149,143 B2  
(45) Date of Patent: Oct. 6, 2015

(54) APPARATUSES, SYSTEMS AND METHODS FOR LOCKING LIFT CORDS USED TO LIFT ARCHITECTURAL OPENING COVERINGS

(71) Applicant: SAFE-T-SHADE, Inc., Cornelius, NC (US)

(72) Inventor: William D. Vestal, Burlington, NC (US)

(73) Assignee: SAFE-T-SHADE, Huntersville, NC (US)

( * ) Notice: Subject to any disclaimer, the term of this patent is extended or adjusted under 35 U.S.C. 154(b) by 0 days.

(21) Appl. No.: 14/021,181

(22) Filed: Sep. 9, 2013

(65) Prior Publication Data

US 2014/0000822 A1    Jan. 2, 2014

Related U.S. Application Data

(62) Division of application No. 13/738,387, filed on Jan. 10, 2013, now Pat. No. 8,540,006.

(60) Provisional application No. 61/643,931, filed on May 8, 2012.

(51) Int. Cl.
*A47H 7/00*    (2006.01)
*A47H 3/02*    (2006.01)
(Continued)

(52) U.S. Cl.
CPC *A47H 3/02* (2013.01); *E06B 9/262* (2013.01); *E06B 9/38* (2013.01); *F16G 11/101* (2013.01); *E06B 2009/2622* (2013.01); *E06B 2009/3265* (2013.01); *Y10T 24/3973* (2015.01)

(58) Field of Classification Search
CPC ............ E06B 9/326; E06B 2009/3265; E06B 2009/2625; E06B 2009/2622; Y10T 24/3984; Y10T 24/3936; Y10T 24/3953; F16G 11/00; F16G 11/10; F16G 11/101

USPC ......... 160/84.04, 84.01, 84.05, 168.1 R, 340, 160/388

See application file for complete search history.

(56) References Cited

U.S. PATENT DOCUMENTS 1,962,964 A * 6/1934 Morrison ...................... 24/134 P
2,226,393 A * 12/1940 Seeger et al. ................ 24/134 P
(Continued)

FOREIGN PATENT DOCUMENTS

CA    2201209 A1    9/1998
FR    2785639 A1    5/2000

OTHER PUBLICATIONS

First Examination Report for New Zealand patent application 610332 mailed May 10, 2013, 2 pages.
(Continued)

*Primary Examiner* — Katherine Mitchell
*Assistant Examiner* — Johnnie A Shablack
(74) *Attorney, Agent, or Firm* — Withrow & Terranova, PLLC

(57) ABSTRACT

A locking member to be used in conjunction with a guide ring and a lift cord configured to raise of lower a covering for an architectural opening, such as a window, door or the like, is disclosed. The locking member is configured to engage the guide ring and the lift cord in such a way that the locking member has a selective rotative ability, which allows the lift cord to freely move in a first direction to raise or lower the covering, but the locking member will move or rotate about the guide ring when the lift cord is pulled in a second direction to pinch the lift cord between the locking member and the guide ring so that the lift cord is prevented from being pulled away from the covering far enough to create a loop of a certain diameter.

15 Claims, 18 Drawing Sheets

(51) Int. Cl.
  *F16G 11/10* (2006.01)
  *E06B 9/38* (2006.01)
  E06B 9/262 (2006.01)
  E06B 9/326 (2006.01)

(56) References Cited

U.S. PATENT DOCUMENTS

| | | | |
|---|---|---|---|
| 2,410,549 A | 11/1946 | Olson | |
| 2,557,877 A * | 6/1951 | Kluson | 84/304 |
| 2,577,046 A | 12/1951 | Svirsky | |
| 3,022,819 A | 2/1962 | Lampret | |
| 3,633,646 A | 1/1972 | Zilver | |
| 3,795,267 A | 3/1974 | Debs | |
| 4,352,386 A | 10/1982 | Butler et al. | |
| 4,685,502 A | 8/1987 | Spangenberg | |
| 4,807,683 A | 2/1989 | Hennequin et al. | |
| 4,817,698 A | 4/1989 | Rossini et al. | |
| 4,865,108 A | 9/1989 | Hennequin et al. | |
| 4,865,109 A | 9/1989 | Sherman | |
| 5,070,805 A * | 12/1991 | Plante | 114/218 |
| 5,273,069 A | 12/1993 | Akiyama et al. | |
| 5,273,096 A | 12/1993 | Thomsen et al. | |
| 5,315,741 A * | 5/1994 | Dubberke | 24/712.1 |
| 5,365,641 A * | 11/1994 | Watanabe et al. | 24/115 G |
| 5,463,797 A * | 11/1995 | Laug et al. | 24/115 G |
| 5,465,775 A | 11/1995 | Biba et al. | |
| 5,465,779 A | 11/1995 | Rozon | |
| 5,472,035 A | 12/1995 | Biba et al. | |
| 5,501,262 A | 3/1996 | Inaba et al. | |
| 5,513,687 A | 5/1996 | Tuzmen et al. | |
| 5,553,649 A | 9/1996 | Chisaka et al. | |
| 5,553,653 A | 9/1996 | Rozon | |
| 5,595,232 A | 1/1997 | Benthin | |
| 5,645,685 A | 7/1997 | Furhman | |
| 5,657,513 A * | 8/1997 | Takahashi | 24/115 G |
| 5,657,807 A | 8/1997 | Hsu | |
| 5,666,699 A * | 9/1997 | Takahashi | 24/115 G |
| 5,671,793 A | 9/1997 | Lee | |
| 5,706,876 A | 1/1998 | Lysyj | |
| 5,709,258 A | 1/1998 | Coccoluto | |
| 5,722,478 A | 3/1998 | Claypool et al. | |
| 5,749,405 A | 5/1998 | Huang | |
| 5,752,558 A | 5/1998 | Lin | |
| 5,797,441 A | 8/1998 | Benthin | |
| 5,819,832 A | 10/1998 | Huang | |
| 5,850,863 A | 12/1998 | Huang | |
| 5,862,850 A | 1/1999 | Yang | |
| 5,904,198 A | 5/1999 | Huang | |
| 6,062,292 A | 5/2000 | Bryant | |
| 6,164,291 A * | 12/2000 | Filippone | 132/273 |
| 6,189,595 B1 | 2/2001 | Lee | |
| 6,196,293 B1 | 3/2001 | Lee | |
| 6,463,987 B1 | 10/2002 | Nevins | |
| 6,477,748 B2 * | 11/2002 | Steiner | 24/130 |
| 6,516,860 B1 | 2/2003 | Weaver et al. | |
| 6,591,461 B2 * | 7/2003 | Salentine et al. | 24/115 F |
| 6,601,633 B2 | 8/2003 | Sun et al. | |
| 6,644,374 B2 | 11/2003 | Nien | |
| 6,680,594 B2 | 1/2004 | Collett et al. | |
| 6,685,592 B2 | 2/2004 | Fraczek et al. | |
| 6,752,194 B1 | 6/2004 | Huang | |
| 6,792,995 B2 | 9/2004 | Judkins | |
| 6,817,399 B2 | 11/2004 | Berman et al. | |
| 6,948,216 B2 * | 9/2005 | Gaudyn et al. | 16/205 |
| 7,036,547 B1 | 5/2006 | Cheng et al. | |
| 7,117,920 B2 | 10/2006 | Dekker et al. | |
| 7,124,801 B2 | 10/2006 | Ng et al. | |
| 7,204,292 B2 | 4/2007 | Nien | |
| 7,261,138 B2 | 8/2007 | Judkins et al. | |
| 7,337,503 B1 * | 3/2008 | Ashbrook | 24/115 G |
| 7,464,742 B2 | 12/2008 | Oskam et al. | |
| 7,597,131 B2 | 10/2009 | Nien et al. | |
| 7,624,784 B2 | 12/2009 | Anthony et al. | |
| 7,669,633 B2 | 3/2010 | Berger | |
| 7,770,625 B2 | 8/2010 | Lukos | |
| 7,775,254 B2 | 8/2010 | Judkins et al. | |
| 7,832,450 B2 | 11/2010 | Brace et al. | |
| 7,938,161 B2 | 5/2011 | Lin | |
| 8,091,606 B2 | 1/2012 | Nien et al. | |
| 8,113,261 B2 | 2/2012 | Lin | |
| 8,205,316 B2 * | 6/2012 | Chu | 29/453 |
| 8,220,517 B2 * | 7/2012 | Kollman et al. | 160/84.01 |
| 8,225,463 B2 * | 7/2012 | Bourke et al. | 24/132 AA |
| 8,245,360 B2 * | 8/2012 | Stafford et al. | 24/136 R |
| 8,256,489 B2 | 9/2012 | Berger | |
| 8,267,144 B2 | 9/2012 | Hsu et al. | |
| 8,281,842 B2 | 10/2012 | Lin | |
| 8,286,686 B2 | 10/2012 | Cannaverde | |
| 8,291,959 B2 | 10/2012 | Cheng | |
| 8,316,911 B2 | 11/2012 | Cleaver | |
| 8,356,653 B2 | 1/2013 | Fu-Lai et al. | |
| 8,365,362 B2 * | 2/2013 | Chou | 24/115 F |
| 8,381,792 B2 | 2/2013 | Perkowitz | |
| 8,474,509 B2 | 7/2013 | Koop | |
| 8,499,815 B2 | 8/2013 | Zhang | |
| 8,511,363 B2 | 8/2013 | Lin | |
| 8,540,006 B1 * | 9/2013 | Vestal | 160/84.04 |
| 8,544,525 B2 | 10/2013 | Zhu | |
| 8,550,141 B2 | 10/2013 | Ding | |
| 8,763,675 B2 | 7/2014 | Zhu | |
| 2003/0192654 A1 | 10/2003 | Nien | |
| 2003/0192655 A1 | 10/2003 | Nien | |
| 2003/0201076 A1 | 10/2003 | Nien | |
| 2004/0003900 A1 | 1/2004 | Nien | |
| 2004/0108080 A1 | 6/2004 | Nien | |
| 2004/0200583 A1 | 10/2004 | Nien | |
| 2005/0109468 A1 | 5/2005 | Hsu | |
| 2006/0157204 A1 | 7/2006 | Lin | |
| 2006/0243402 A1 | 11/2006 | Chang | |
| 2007/0023149 A1 * | 2/2007 | Lamars et al. | 160/84.01 |
| 2007/0235147 A1 | 10/2007 | Zakowski et al. | |
| 2008/0083511 A1 | 4/2008 | Hung | |
| 2009/0064473 A1 * | 3/2009 | Chan | 24/712.5 |
| 2009/0071610 A1 | 3/2009 | Bossler | |
| 2010/0101741 A1 | 4/2010 | Koop | |
| 2010/0126673 A1 * | 5/2010 | Lin | 160/84.01 |
| 2010/0126674 A1 * | 5/2010 | Lin | 160/84.03 |
| 2010/0126679 A1 * | 5/2010 | Lin | 160/370 |
| 2010/0193141 A1 * | 8/2010 | Liang et al. | 160/84.03 |
| 2010/0212120 A1 * | 8/2010 | LeBlanc | 24/457 |
| 2010/0257701 A1 * | 10/2010 | Gammell et al. | 24/115 G |
| 2010/0269984 A1 | 10/2010 | Hanley et al. | |
| 2010/0269985 A1 | 10/2010 | Hanley et al. | |
| 2010/0294438 A1 | 11/2010 | Kirby et al. | |
| 2010/0326608 A1 | 12/2010 | Wen et al. | |
| 2011/0036512 A1 | 2/2011 | Su | |
| 2011/0048652 A1 | 3/2011 | Chen | |
| 2011/0056633 A1 | 3/2011 | Lin | |
| 2011/0067820 A1 | 3/2011 | Hsu et al. | |
| 2011/0073260 A1 * | 3/2011 | Kollman et al. | 160/84.04 |
| 2011/0083816 A1 | 4/2011 | Chen | |
| 2011/0107557 A1 * | 5/2011 | Bourke et al. | 24/115 R |
| 2011/0108206 A1 | 5/2011 | Hsu et al. | |
| 2011/0132554 A1 | 6/2011 | Lin | |
| 2011/0168339 A1 | 7/2011 | Bowen et al. | |
| 2011/0192549 A1 | 8/2011 | Wen et al. | |
| 2011/0192550 A1 | 8/2011 | Williams, III | |
| 2011/0192557 A1 | 8/2011 | Ling | |
| 2011/0247761 A1 | 10/2011 | Lin | |
| 2011/0247762 A1 | 10/2011 | Lin | |
| 2011/0247763 A1 | 10/2011 | Hu et al. | |
| 2011/0247765 A1 | 10/2011 | Lin | |
| 2011/0297336 A1 * | 12/2011 | Chen | 160/340 |
| 2011/0297337 A1 * | 12/2011 | Chen | 160/340 |
| 2012/0067527 A1 | 3/2012 | Cheng | |
| 2012/0097342 A1 | 4/2012 | Tu | |
| 2012/0097343 A1 | 4/2012 | O'Hair | |
| 2012/0267056 A1 | 10/2012 | Ko | |
| 2012/0285634 A1 | 11/2012 | Zhu | |
| 2013/0068405 A1 | 3/2013 | Lava et al. | |

OTHER PUBLICATIONS

International Search Report for PCT/US2010/062057 mailed Oct. 27, 2011, 20 pages.

(56) References Cited

OTHER PUBLICATIONS

International Preliminary Report on Patentability for PCT/US2010/062057 mailed Jul. 4, 2013, 14 pages.
International Search Report for PCT/US2011/026410 mailed May 3, 2012, 13 pages.
International Search Report for PCT/US2012/034984 mailed Jul. 13, 2012, 9 pages.
International Preliminary Report on Patentability for PCT/US2012/034984 mailed Nov. 7, 2013, 7 pages.
International Search Report for PCT/US2012/034990 mailed Jul. 20, 2012, 9 pages.
International Preliminary Report on Patentability for PCT/US2012/034990 mailed Nov. 7, 2013, 7 pages.
Non-final Office Action for U.S. Appl. No. 12/976,677 mailed Nov. 19, 2013, 10 pages.
Non-final Office Action for U.S. Appl. No. 13/094,727 mailed Aug. 29, 2012, 10 pages.
Non-final Office Action for U.S. Appl. No. 12/976,732 mailed Nov. 19, 2012, 14 pages.
Non-final Office Action for U.S. Appl. No. 13/035,222 mailed Jan. 2, 2013, 6 pages.
Final Office Action for U.S. Appl. No. 13/035,222 mailed Jul. 17, 2013, 5 pages.
Non-final Office Action for U.S. Appl. No. 13/094,705 mailed Jan. 14, 2013, 6 pages.
Final Office Action for U.S. Appl. No. 13/094,705 mailed Jul. 18, 2013, 6 pages.
Non-final Office Action for U.S. Appl. No. 13/738,387 mailed May 13, 2013, 15 pages.
Notice of Allowance for U.S. Appl. No. 13/738,387 mailed Jul. 10, 2013, 9 pages.
Non-final Office Action for U.S. Appl. No. 13/094,727 mailed Apr. 10, 2013, 13 pages.
Non-final Office Action for U.S. Appl. No. 13/094,727 mailed Nov. 25, 2013, 10 pages.
Final Office Action for U.S. Appl. No. 12/976,732 mailed Jun. 25, 2013, 16 pages.
Partial European Search Report for European patent application 13166761.0 mailed Nov. 20, 2013, 8 pages.
Non-final Office Action for U.S. Appl. No. 12/976,732 mailed Dec. 18, 2013, 12 pages.
Author Unknown, "On," Dictionary.com, accessed Jun. 29, 2014, http://dictionary.reference.com/browse/on, Random House, Inc., 1 page.
Final Office Action for U.S. Appl. No. 12/976,677, mailed Jul. 9, 2014, 16 pages.
Final Office Action for U.S. Appl. No. 13/094,727 mailed Jul. 17, 2014, 12 pages.
Further Examination Report for New Zealand Patent Application No. 610332, mailed Aug. 15, 2014, 2 pages.
Final Office Action for U.S. Appl. No. 13/035,222, mailed Oct. 1, 2014, 6 pages.
Extended European Search Report for European patent application 13166761.0 mailed Apr. 1, 2014, 11 pages.
Non-final Office Action for U.S. Appl. No. 13/035,222 mailed Apr. 17, 2014, 7 pages.
Non-Final Office Action for U.S. Appl. No. 13/094,705, mailed May 29, 2014, 6 pages.
Notice of Allowance for U.S. Appl. No. 12/976,732, mailed May 1, 2014, 8 pages.
Notice of Allowance and Applicant-Initiated Interview Summary for U.S. Appl. No. 12/976,677 mailed Dec. 29, 2014, 10 pages.
Final Office Action for U.S. Appl. No. 13/094,705 mailed Oct. 28, 2014, 9 pages.
Notice of Allowance and Applicant-Initiated Interview Summary for U.S. Appl. No. 13/094,727 mailed Oct. 31, 2014, 9 pages.
Non-Final Office Action for U.S. Appl. No. 13/035,222, mailed Apr. 3, 2015, 5 pages.
Advisory Action for U.S. Appl. No. 13/094,705, mailed Apr. 7, 2015, 3 pages.

* cited by examiner

APPARATUSES, SYSTEMS AND METHODS FOR LOCKING LIFT CORDS USED TO LIFT ARCHITECTURAL OPENING COVERINGS

RELATED APPLICATIONS

This application is a Divisional of U.S. patent application Ser. No. 13/738,387, filed Jan. 10, 2013, entitled "Apparatuses, Systems and Methods for Locking Lift Cords Used to Lift Architectural Opening Coverings", now issued U.S. Pat. No. 8,540,006, issued Sep. 24, 2013, which is incorporated herein by reference in its entirety.

This application claims the benefit of U.S. Provisional Patent Application 61/643,931, filed May 8, 2012, entitled "Apparatuses, Systems and Methods for Locking Lift Cords Used to Lift Architectural Opening Coverings", which is incorporated herein by reference in its entirety.

This application is related to co-pending U.S. patent application Ser. No. 12/976,732, filed Dec. 22, 2010, entitled "Cordless Covering for Architectural Opening", now issued U.S. Pat. No. 8,763,671, issued Jul. 1, 2014, which is incorporated herein by reference in its entirety.

This application is also related to co-pending U.S. patent application Ser. No. 12/976,677, filed Dec. 22, 2010, entitled "Architectural Cover Operating Assembly," which is incorporated herein by reference in its entirety.

This application is also related to co-pending U.S. patent application Ser. No. 13/035,222, filed Feb. 25, 2011, entitled "Cordless Blind System and Retro-Fit Method", which is incorporated herein by reference.

This application is also related to co-pending U.S. patent application Ser. No. 13/094,705, filed Apr. 26, 2011, entitled "Cordless Blind System and Retro-Fit Method", which is incorporated herein by reference.

This application is also related to co-pending U.S. patent application Ser. No. 13/094,727, filed Apr. 26, 2011, entitled "Cordless Covering for Architectural Opening", now issued U.S. Pat. No. 8,950,463, issued Feb. 10, 2015, which is incorporated herein by reference.

FIELD OF THE DISCLOSURE

Embodiments disclosed herein include apparatuses, systems, and methods for locking lift cords, particularly lift cords for coverings for architectural openings. In particular, a locking mechanism is disclosed that can be used with lift cords for architectural coverings, such as a shade, to avoid having a hazardous loop formed by the lift cord.

BACKGROUND

In the use of window and architectural passage coverings, the art has long relied on cords, string or the like to extend and retract the coverings. Such coverings take many forms, including shades such as curtains, roll-up shades, Venetian blinds, vertical blinds, cellular shades, and the like. The problem with such coverings that rely on cords is that small children can become entangled in the cords and experience serious harm, including strangulation and death. On Aug. 26, 2009, the U.S. Consumer Product Safety Commission announced a voluntary recall of all ¼ inch Oval Roll-up Blinds and Woolrich Roman Shades, including some 4.2 million roll-up blinds and 600,000 Roman shades. The Commission referenced the hazard that "[s]trangulations can occur if the lifting loops slide off the side of the blind and a child's neck becomes entangled on the free-standing loop or if a child places his/her neck between the lifting loop and the roll-up blind material." Recent cited injuries include a report that "[i]n November 2007, a 1-year-old boy from Norridgewock, Me. became entangled and strangled in the lift cord loop of a roll-up blind that had fallen into his portable crib. In October 2008, a 13-month-old boy from Conway, Ark. was found with his head between the exposed inner cord and the cloth on the backside of a Roman shade. The cord was not looped around the boy's neck but rather ran from car to ear and strangled the child," Numerous manufacturers and retailers have followed their call.

In addition to the internal cords attached to the shade or blinds that can be pulled out and pose a problem, the pull cords, string and beaded cords in mechanical based blinds and shades that are pulled on to draw up the blinds or shades also pose a risk since they also create a hazardous loop of sufficient diameter (12 inches per the Consumer Product Safety Commission) for a small child to get their head tangled inside. Some industry standards consider a loop of seven and one half inches to be hazardous. Even the retrofit devices currently available do not eliminate the hazardous loops created by the beaded cords even if they are tied to the wall with a tie-down device such as a Rollease™ product or with separated draw strings and/or cord stops that could still become tangled together to create a hazardous loop.

U.S. Pat. No. 7,624,784 to Anthony, et al. (hereinafter "Anthony") discloses a segmented roll-up covering with a plurality of roller assemblies utilized to form panels wherein each roller assembly includes a strip of flexible lift sheet material and an associated roller about which the material can be wrapped. One edge of the lift sheet material is fixed to a relatively rigid bar or is otherwise supported while the opposite edge is secured to its associated roller. The roller with the lift sheet material secured thereto is cradled in one of a plurality of cradles provided in a first lift system which includes a cord ladder or similar structure so that upon movement of one vertical run of the cord ladder between an elevated and a lowered position while the other vertical run remains stationary, the cradle is raised or lowered thereby lifting or lowering the roller causing it to roll and either roll the fabric thereabout or unroll the fabric there from depending upon the direction of rotational movement of the roller. One problem with this system is that the lift system is enabled by a cord ladder, which as mentioned above, can pose a danger to small children.

There have been attempts to create cordless coverings in the art to address the danger posed by lift cords. One example is U.S. Pat. No. 7,036,547 to Cheng, et al. (hereinafter "Cheng") discloses an assembly that includes a shade capable of height adjustment, comprising a shade with multiple pleats, a roller, a strap that extends through multiple pleats of the assembly, and at least one strap operatively connected with the roller to be raised and lowered as the height of the shade is increased or decreased. While Cheng discloses a cordless lift mechanism, the lift mechanism disclosed involves straps or narrow ribbons of fabric that would not reduce the strangulation risk to a child. In addition, the straps are threaded through the shade, exposing holes by which light can pass through the shade. Moreover, the straps are not sufficient to hold heavy shades, curtains and the like.

U.S. Published Patent Application No. 20050109468 to Hsu (hereinafter "Hsu") discloses a cordless blind structure that includes a blind body attached to the underside of an upper beam, and a plurality of magnet components of elongated bars or blocks equidistantly distributed from the bottom-most slat upward to the top of the blind body. Hsu's system includes magnet components fixed to the outer surface of the blind body that acts as a cordless lift mechanism wherein the magnet components are consecutively lifted upwards and sequentially piled up in order to fold up the slats of the blind body. To unfold the blind body, the blind body is pulled slightly downwards by the bottom-most slat to detach the engaged magnet components from one another, releasing the collected blind body to suspend downwards. One drawback to the system of Hsu is the requirement of having expensive and likely heavy magnets capable of holding the weight of the blind or sacrificing weight for security that precludes the use of such system with heavier coverings such as shades, curtains and the like. Moreover, the system of Hsu fails to include guiding members to assure that the blind is folded properly.

U.S. Pat. No. 5,706,876 to Lysyj (hereinafter "Lysyj") discloses a cordless, cellular window shade that uses a conventional roller shade bar to raise and lower transversely spaced tapes that extend through slits in the cellular fabric and are secured to the bottom rail of the shade. The deficiencies of the Cheng shade assembly are also present in the shade disclosed in Lysyj.

U.S. Pat. No. 5,273,096 to Thomsen et al. (hereinafter "Thomsen") discloses an apparatus for gripping lengths of sheet material in a foldable blind or shade, in a blind that is composed of one continuous piece of fabric. Tubular members having longitudinal openings therein which accept the sheet material through grooves are described. Rod members also fit within the tubular members, to hold the sheet material between the tubular members and the rod members. Guide means are arranged to guide pull cords, and engage a longitudinal groove in each tubular member. Thomsen discloses a powered lift mechanism, but only exemplifies shades that include corded lift mechanisms that do not eliminate the risk of strangulation.

In consequence, the art is in need of improvement in coverings for architectural openings that maintains the functionality and aesthetics of previously developed coverings, but avoids their deficiencies, particularly their hazardous character as regards the risk of injury or death associated with the use of cord arrangements. The art also is in need of a new mechanism to allow the lifting of shades without creating a hazardous loop.

SUMMARY

Embodiments disclosed in the present Specification relate to a locking mechanism for a lift cord configured to raise of lower a covering for an architectural opening, such as a window, door or the like. In particular, embodiments disclosed in the present description relate to a locking member to be used in conjunction with a guide ring and a lift cord for a covering for an architectural opening, such as a window, door, portal, or the like. The locking member is configured to engage the guide ring and the lift cord. The locking member is configured to engage the guide ring and the lift cord in such a way that the locking member has a selective rotative ability, which allows the lift cord to freely move in a first direction to raise or lower the covering, but the locking member will move or rotate about the guide ring when the lift cord is pulled in a second direction to pinch the lift cord between the locking member and the guide ring so that the lift cord is prevented from being pulled away from the covering far enough to create a loop of a certain diameter.

In one embodiment, an apparatus for locking a lift cord designed to lift coverings for architectural openings is disclosed. The apparatus comprises a locking member having a groove and at least one opening. The groove is configured to engage a guide ring attached to a covering for an architectural opening. The at least one opening is configured to receive the lift cord such that the lift cord passes through both the guide ring and the locking member. The locking member is configured to engage the guide ring and the lift cord such that the locking member allows the lift cord to freely move in and out of the at least one opening in a first direction to raise or lower the covering. The locking member is further configured to move about the guide ring when the lift cord is pulled in a second direction to pinch the lift cord between the locking member and the guide ring to prevent the lift cord from being pulled away from the covering far enough to create a loop of greater than a certain diameter.

In another embodiment, an alternate apparatus for locking a lift cord designed to lift coverings for architectural openings is disclosed. The locking apparatus comprises a ring base attached to a covering for an architectural opening, the ring base having a plurality of slots. The apparatus further comprises a snap-on post having at least one opening and a plurality of prongs disposed on a surface of the snap-on post. The at least one opening of the snap-on post is configured to receive the lift cord. The snap-on post cam ne snapped onto the ring base by fitting each of the plurality of prongs into a corresponding one of the plurality of slots of the ring base. The apparatus further comprises a rotative lock member having at least one opening configured to receive the lift cord. The rotative lock member is configured to be positioned around the snap-on post such that the at least one opening of the rotative lock member is aligned with the at least one opening of the snap-on post to allow the lift cord to pass through the at least one opening of both the snap-on post and the rotative lock member. The rotative lock member is further configured to allow the lift cord to freely move in and out of the at least one opening of both the snap-on post and the rotative lock member in a first direction to raise or lower the coverin. The rotative lock member is configured to move about the snap-on post when the lift cord is pulled in a second direction to pinch the lift cord between the rotative lock member and the snap-on post to prevent the lift cord from being pulled away from the covering far enough to create a loop of greater than a certain diameter.

In another embodiment, a method for locking a lift cord designed to lift coverings for architectural openings is disclosed. The method comprises providing a covering for an architectural opening that is configured to be raised or lowered by at least one lift cord. The method also comprises attaching a guide ring to a surface of the covering. A locking member having a groove and at least one opening is positioned such that the groove of the locking member is configured to engage the guide ring, and the at least one opening is configured to receive the lift cord such that the at least one lift cord passes through both the guide ring and the locking member. The locking member is configured to engage the guide ring and the at least one lift cord such that the locking member allows the at least one lift cord to freely move in and out of the at least one opening in a first direction to raise or lower the covering. The locking member is further configured to move about the guide ring when the at least one lift cord is pulled in a second direction to pinch the at least one lift cord between the locking member and the guide ring to prevent the at least one lift cord from being pulled away from the covering far enough to create a loop of greater than a certain diameter.

In another embodiment, another method for locking a lift cord designed to lift coverings for architectural openings is disclosed. The method comprises providing a covering for a architectural opening that is configured to be raised or lowered by at least one lift cord. The method also comprises attaching a ring base having a plurality of slots to the covering for an architectural opening. A snap-on post having at least one opening and a plurality of prongs disposed on a surface of the snap-on post is then snapped onto the ring base by fitting each of the plurality of prongs into a corresponding one of the plurality of slots of the ring base. The at least one opening of the snap-on post is configured to receive the at least one lift cord. The method further comprises positioning a rotative lock member around the snap-on post. The rotative lock member comprises at least one opening configured to receive the at least lift cord, which is aligned with the at least one opening of the snap-on post to allow the at least one lift cord to pass through the at least one opening of both the snap-on post and the rotative lock member. The rotative lock member is configured to allow the at least one lift cord to freely move in and out of the at least one opening of both the snap-on post and the rotative lock member in a first direction to raise or lower the covering. The rotative lock member is further configured to move about the snap-on post when the at least one lift cord is pulled in a second direction to pinch the at least one lift cord between the rotative lock member and the snap-on post to prevent the at least one lift cord from being pulled away from the covering far enough to create a loop of greater than a certain diameter.

In yet another embodiment, a system for locking a lift cord designed to lift coverings for architectural openings is disclosed. The system comprises a covering for a architectural opening that is configured to be raised or lowered by at least one lift cord. At least one guide ring is attached to a surface of the covering. The system also includes a locking member having a groove and at least one opening. The groove of the locking member is configured to engage the guide ring, and the at least one opening is configured to receive the lift cord such that the at least one lift cord passes through both the guide ring and the locking member. The locking member is configured to engage the guide ring and the at least one lift cord such that the locking member allows the at least one lift cord to freely move in and out of the at least one opening in a first direction to raise or lower the covering. The locking member is further configured to move about the guide ring when the at least one lift cord is pulled in a second direction to pinch the at least one lift cord between the locking member and the guide ring to prevent the at least one lift cord from being pulled away from the covering far enough to create a loop of greater than a certain diameter.

In another embodiment, an alternate system for locking a lift cord designed to lift coverings for architectural openings is disclosed. The system comprises a covering for a architectural opening that is configured to be raised or lowered by at least one lift cord. The system also comprises a ring base attached to the covering, the ring base having a plurality of slots to the covering for an architectural opening. The system further comprises a snap-on post having at least one opening and a plurality of prongs disposed on a surface of the snap-on post, wherein the at least one opening is configured to receive the at least one lift cord. Each of the plurality of prongs is configured to fit into a corresponding one of the plurality of slots of the ring base such that the snap-on post can be snapped onto the ring base. The system further comprises a rotative lock member having at least one opening configured to receive the lift cord. The rotative lock member is configured to be positioned around the snap-on post such that the at least one opening of the rotative lock member is aligned with the at least one opening of the snap-on post to allow the lift cord to pass through the at least one opening of both the snap-on post and the rotative lock member. The rotative lock member is configured to allow the lift cord to freely move in and out of the at least one opening of both the snap-on post and the rotative lock member in a first direction to raise or lower the covering. The rotative lock member is further configured to move about the snap-on post when the lift cord is pulled in a second direction to pinch the lift cord between the rotative lock member and the snap-on post to prevent the lift cord from being pulled away from the covering far enough to create a loop of greater than a certain diameter.

Other aspects, features and embodiments will be more fully apparent from the ensuing disclosure and appended claims.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Embodiments disclosed in the present Specification relate to a locking mechanism for a lift cord configured to raise of lower a covering for an architectural opening, such as a window, door or the like. In particular, embodiments disclosed in the present description relate to a locking member to be used in conjunction with a guide ring and a lift cord for a covering for an architectural opening, such as a window, door, portal, or the like. The locking member is configured to engage the guide ring and the lift cord. The locking member is configured to engage the guide ring and the lift cord in such a way that the locking member has a selective rotative ability, which allows the lift cord to freely move in a first direction to raise or lower the covering, but the locking member will move or rotate about the guide ring when the lift cord is pulled in a second direction to pinch the lift cord between the locking member and the guide ring so that the lift cord is prevented from being pulled away from the covering far enough to create a loop of a certain diameter.

The advantages and features of the embodiments disclosed herein are further illustrated with reference to the following disclosure, which is not to be construed as in any way limiting the scope of the invention but rather as illustrative of the invention in a specific application thereof.

Figure 1A:
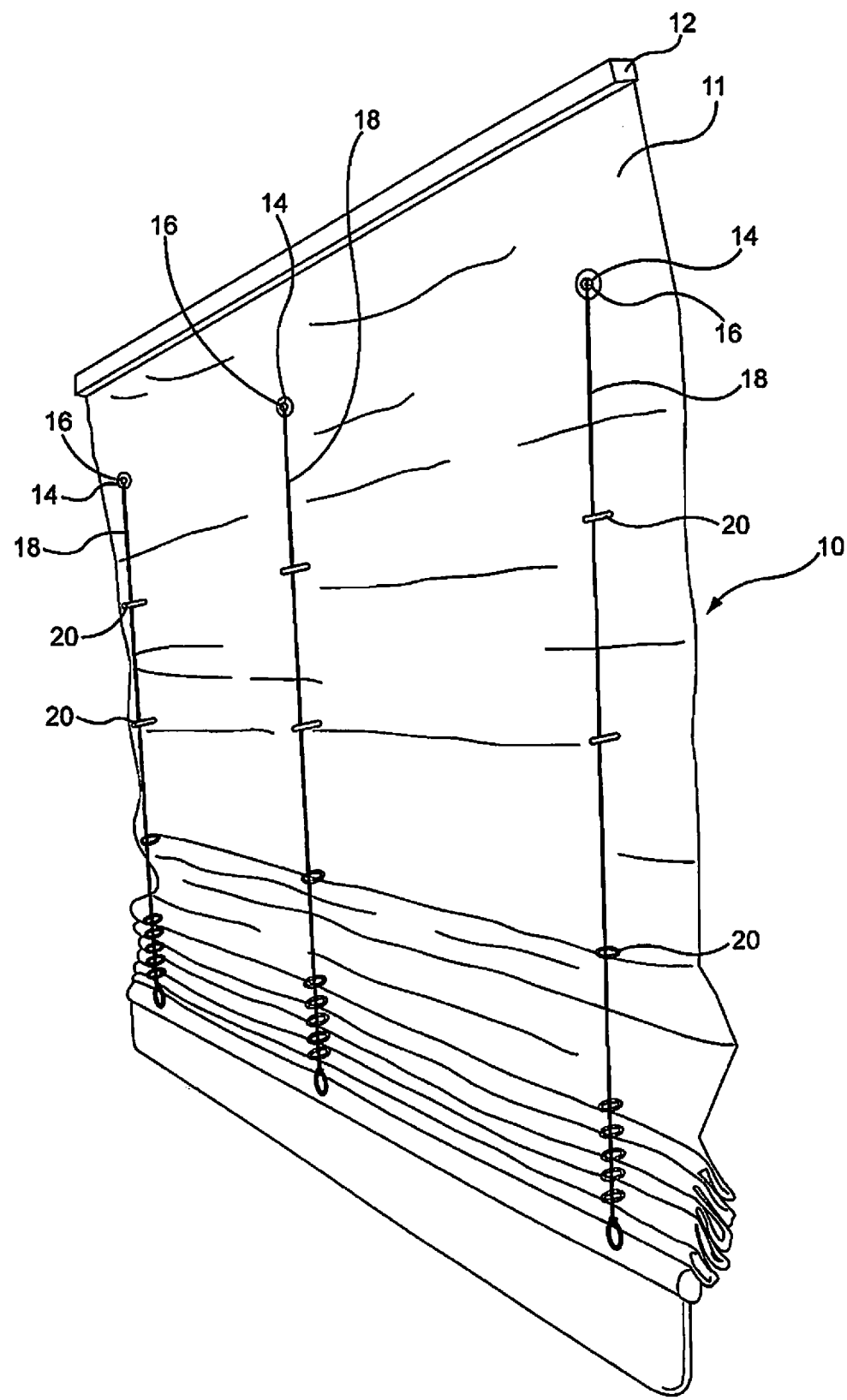
FIG. 1A is a representative back view of a prior art architectural opening covering system that uses lift cords.

FIG. 1A is a representative back view of a prior art architectural opening covering system that uses lift cords. The architectural opening covering system 10 comprises a shade 11 made of any suitable material, including but not limited to fabric, wood, or plastic. In one embodiment, the shade 11 may comprise a lift sheet material with a decorative shade material behind it. The architectural opening covering system 10 includes a support member 12 for attaching to or above a window, door, portal or other architectural opening. The support member 12 is preferably attached at the top of the architectural opening so that gravity can aid in lowering the covering or shade 11 over the opening. One end of the shade 11 is preferably attached to the support member 12 at one end, and another end of the shade 11 is affixed or engaged in some way to a lift bar 13 at another end. The shade 11 may be affixed or engaged to the support member 12 and the lift bar 13 in any suitable manner, such as with magnetic strips, Velcro® hook and loop fastener members, adhesive, stitching, or a pocket for collecting the lift bar 13 attached to the shade 11 via any suitable means. The shade 11 can be any woven or non-woven material, fabric or the like.

The shade 11 has grommets 14 surrounding openings 16 for one or more lift cords 18 to pass through the openings 16. The lift cords 18 are attached to the support member 12 and to the lift bar 13 and are configured to lift the shade 13 when actuated. The lift cords 18 may be actuated by any known method, including a roller or crank mechanism (not shown). The shade 11 may also have one or more guide rings 20 that the lift cord 18 passes through to aid in the rising and lowering of the shade 11. The guide rings 20 allow the lift cord 18 to pass through as the lift cord 18 moves to raise or lower the shade 11. As the shade 11 is drawn upwards by the lift cord 18 passing through the guide rings 20, the guide rings 20 stack on top of each other and raise the shade 11 upwardly into folded layers stacked in an accordion fashion (see bottom of FIG. 1A). As pictured in FIG. 1A, there are three lift cords 18 and three rows of guide rings 20, with 8 guide rings in each row. However, depending on the size and type of architectural covering, any number of lift cords 18 may be used, with any number of rows and any number of guide rings in each row.

Figure 1B:
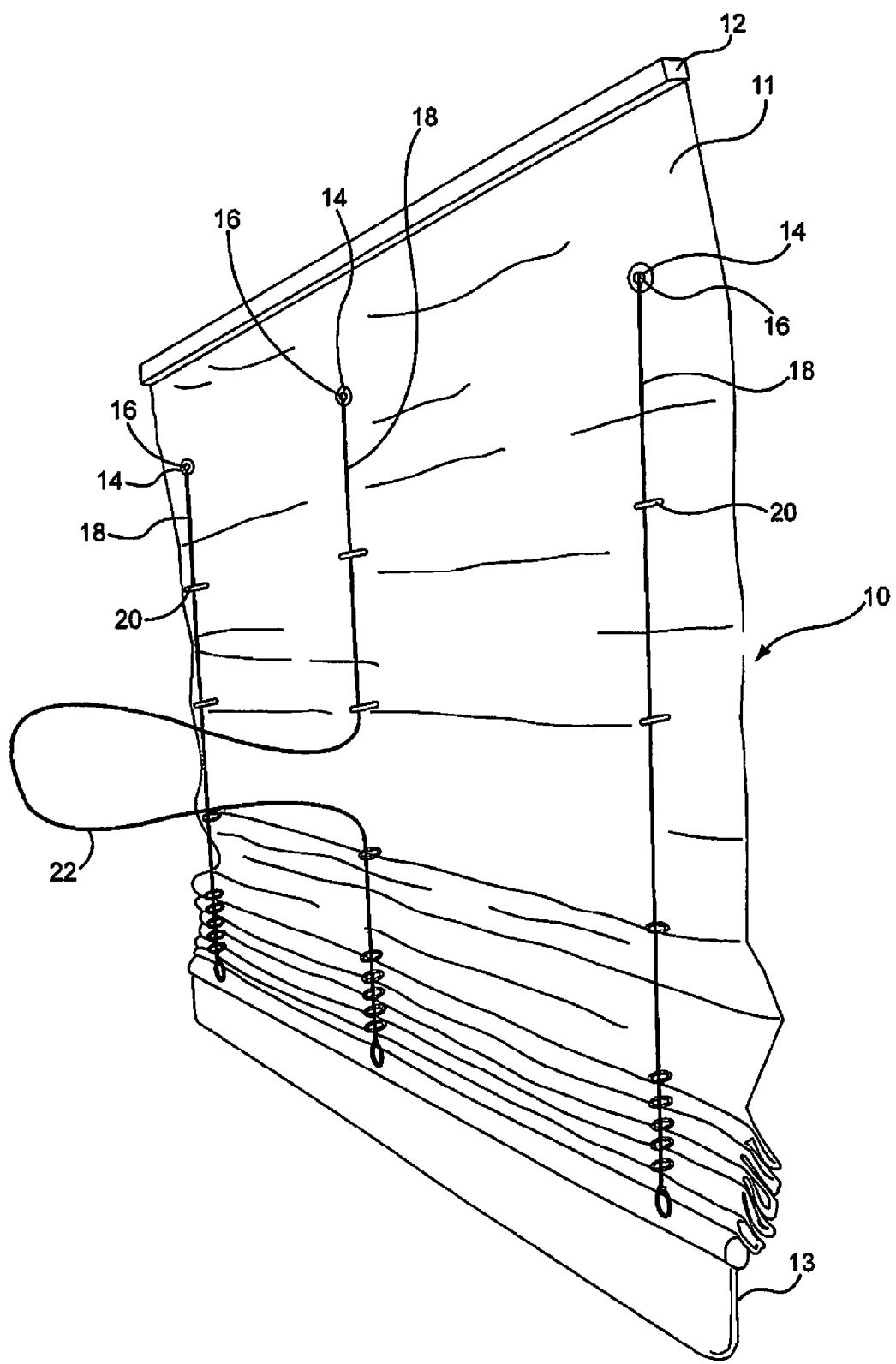
FIG. 1B is a representative side view of the prior art architectural opening covering system of FIG. 1 illustrating how hazardous loops can be formed by the lift cords of the prior art.

FIG. 1B is a representative side view of the prior art architectural opening covering system of FIG. 1 illustrating how hazardous loops can be formed by the lift cords of the prior art. Due to the slack necessary to allow the lift cords 18 to raise and lower the shade 11 in the prior art architectural opening covering system 10, the lift cords 18 may be able to be pulled out away from the shade 11 to a distance that allows a hazardous loop 22 to be formed. A loop is considered to be a hazardous loop per the Consumer Product Safety Commission when the loop has a diameter of approximately twelve (12) inches, sufficient for a small child to get their head tangled inside. Some industry standards consider a loop of approximately seven and one half (7.5) inches to be hazardous. The art is therefore in need of systems and methods to allow the lifting of shades without creating a hazardous loop by the lift cords. In one embodiment, the loop should be smaller than the listed diameters when approximately ten (10) pounds) of push force or approximately five (5) pounds of pull force is exerted on the lift cord.

Figure 2:
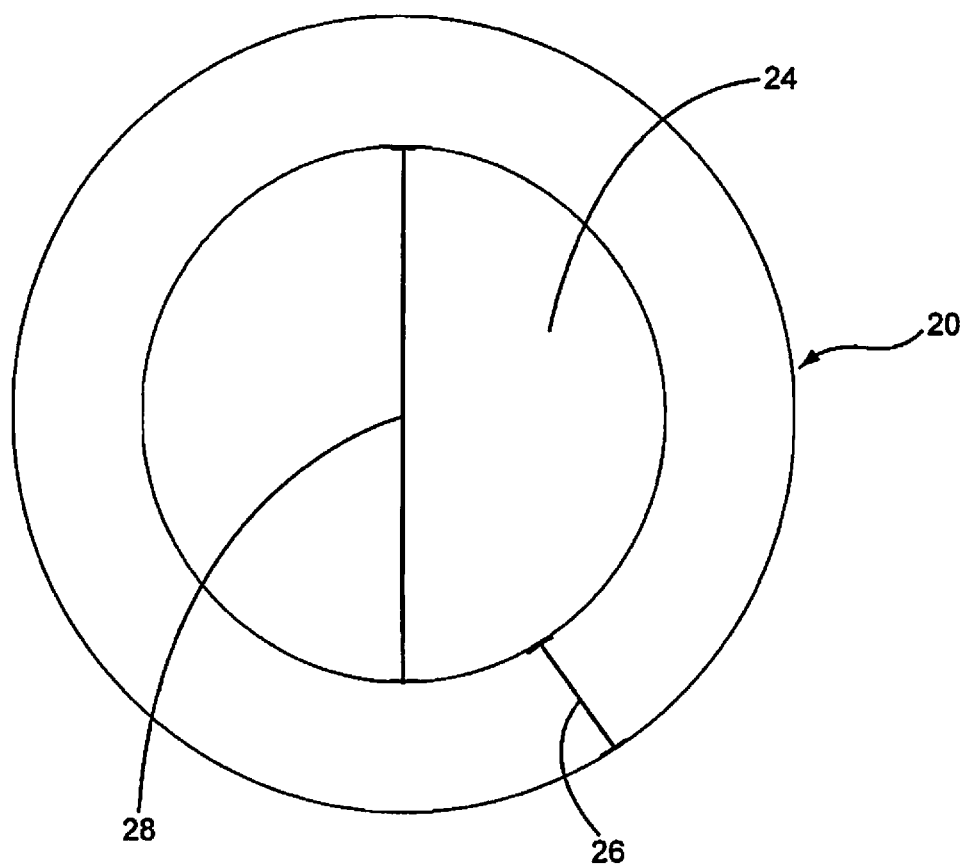
FIG. 2 is a representative view of an exemplary guide ring used in one embodiment of an exemplary system for locking lift cords used in architectural opening covering systems.

FIG. 2 is a representative view of an exemplary guide ring used in one embodiment of an exemplary system for locking lift cords used in architectural opening covering systems. Referring to FIG. 2, an exemplary guide ring 20 is illustrated. The guide 20 may be made of any suitable material, including but not limited to plastic, wood, or metal, including but not limited to brass. In addition, the guide ring 20 shown in FIG. 2 is circular, but any other suitable shape may be used, including but limited to square, rectangular, or D-shaped guide rings. The guide ring 20 has a thickness 26, which may be any suitable thickness, and an inner diameter 28, which may be of any suitable diameter. In one embodiment, the thickness 26 is approximately 0.09 inches and the inner diameter 28 is approximately 0.38 inches.

Figure 3A:
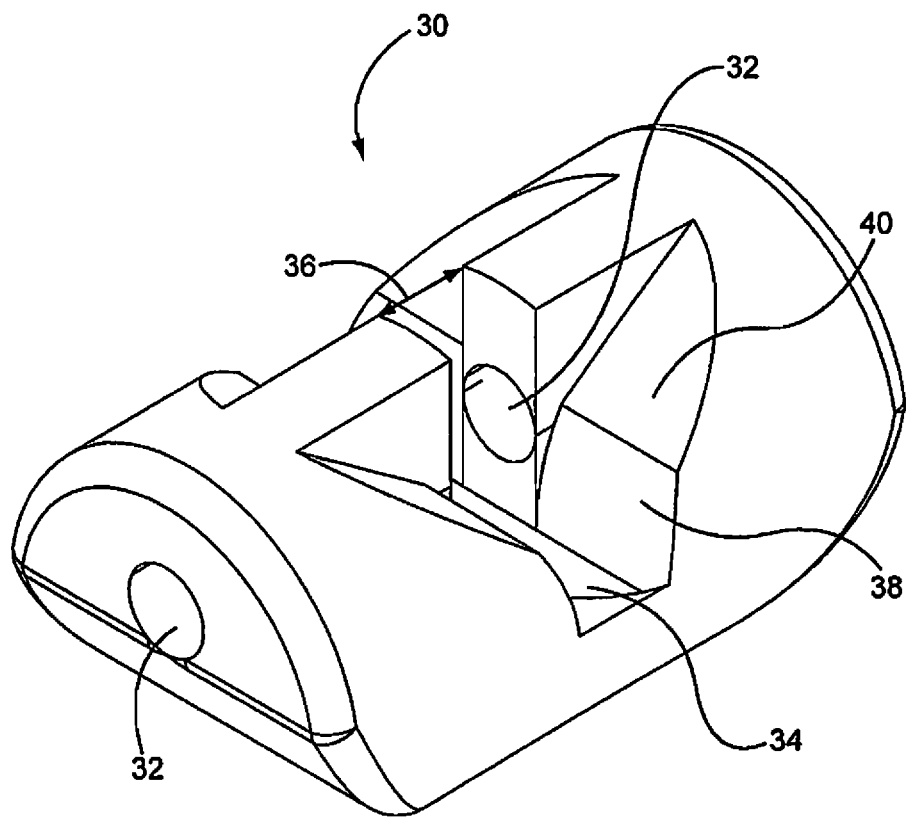
FIG. 3A is a representative front view of an exemplary locking member used in one embodiment of an exemplary system for locking lift cords used in architectural opening covering systems.
Figure 3B:
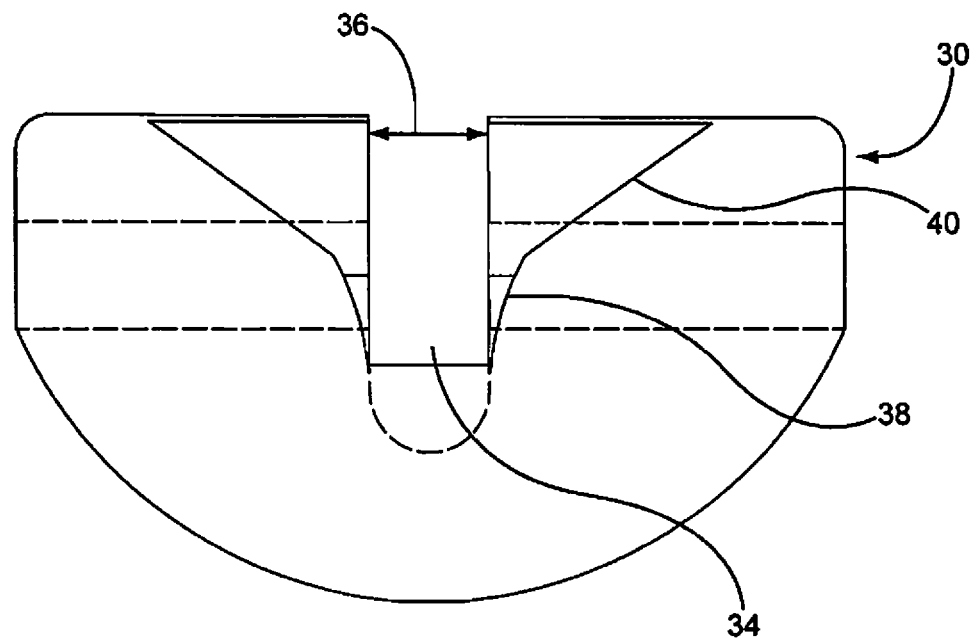
FIG. 3B is a representative sectional end view of the exemplary locking member shown in FIG. 3A.
Figure 3C:
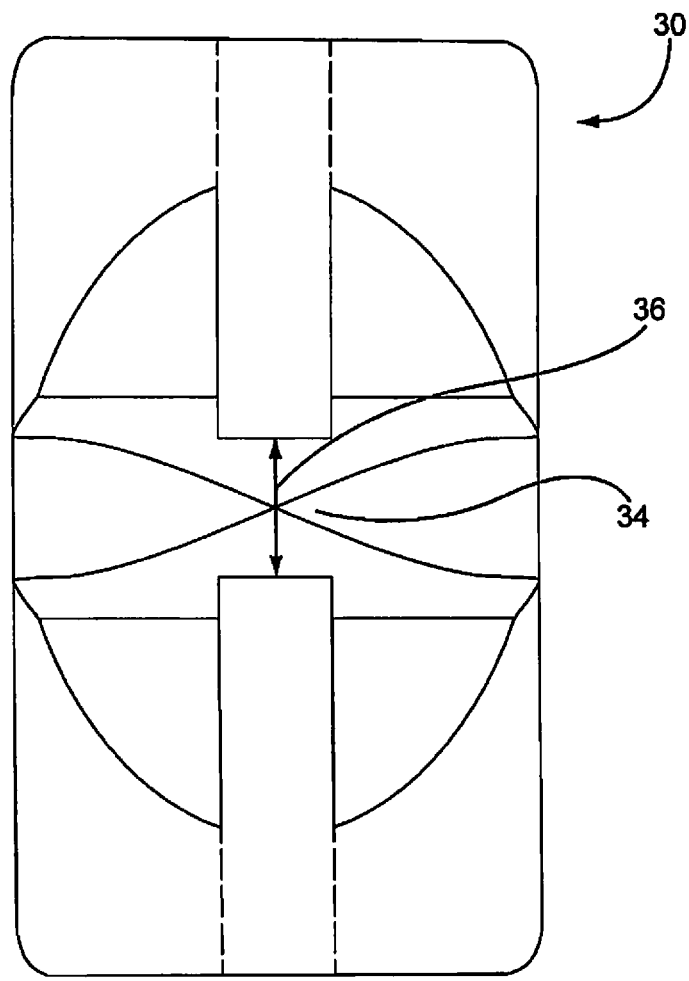
FIG. 3C is a representative top view of the exemplary locking member shown in FIG. 3A.

FIGS. 3A-3C illustrate various views of an exemplary locking member 30. In the embodiment shown in FIGS. 3A-3C, the locking member 30 is a unitary member. FIG. 3A is a representative front view of an exemplary locking member 30 used in one embodiment of an exemplary system for locking lift cords used in architectural opening covering systems. FIG. 3B is a representative sectional end view of the exemplary locking member shown in FIG. 3A. FIG. 3C is a representative top view of the exemplary locking member shown in FIG. 3A.

The locking member 30 of FIGS. 3A-3C may be used in conjunction with the guide ring 20 and a lift cord like the lift cords 18 shown in FIGS. 1A and 1B. The locking member 30 is configured to engage the guide ring 20 and the lift cord 18 in such a way that the locking member has a selective rotative ability, which allows the lift cord 18 to freely move in a first direction to raise or lower a shade or other architectural opening covering, but will rotate about the guide ring 20 when the lift cord 18 is pulled in a second direction to pinch the lift cord between the locking member 30 and the guide ring 20 so that the lift cord 18 is prevented from being pulled away from the covering far enough to create a loop of a certain diameter.

The locking member 30 comprises openings 32 configured to receive a lift cord 18 and allow the lift cord 18 to pass freely through the openings 32 in a first direction. The locking member also comprises a groove 34 that has a width 36. The width 36 of the groove 34 is selected to correspond to the thickness 26 of the guide ring 20 such that the guide ring 20 can fit snugly into the groove 34 of the locking member 30, such that the guide ring 20 is engaged with the locking member 30, and the locking member 30 can still move about the guide ring 20. The locking member 30 may also have a first interior wall 38 and a second interior wall 40. The first interior wall 38 and a second interior wall 40 can be formed when the locking member 30 is machined or otherwise manufactured.

The first interior wall 38 and a second interior wall 40 may be formed to each have an angle sufficient to allow the locking member 30 to freely rotate around the guide ring 20 enough to pinch the lift cord 18 when the lift cord 18 runs through the openings 32 of the locking member 30 and the lift cord is pulled in a direction other than the first direction used to raise and lower the shade 11. In one embodiment, the first interior wall 38 has an angle of approximately twenty-one (21) degrees and the second interior wall 40 has an angle of approximately thirty-five (35) degrees.

Figure 4A:
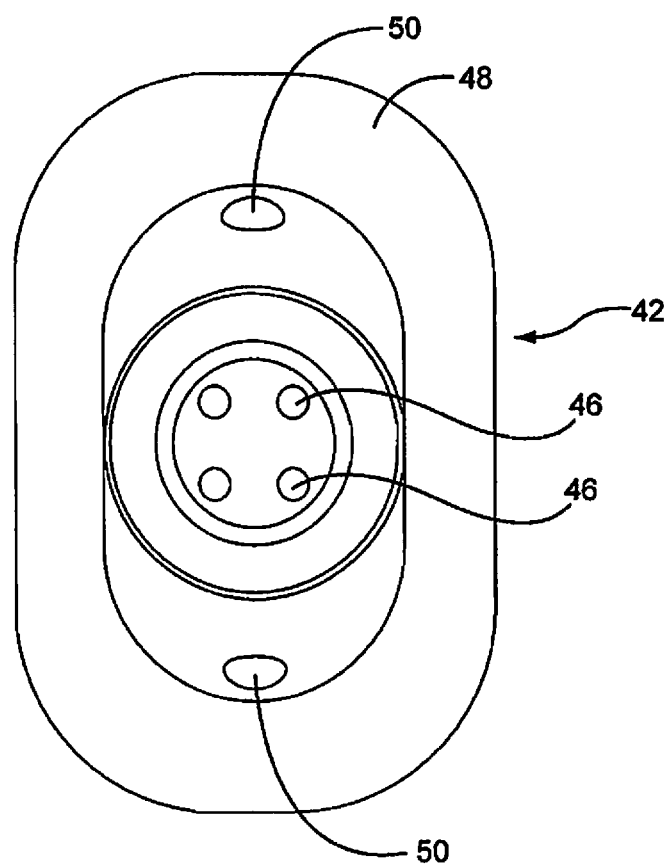
FIG. 4A is a representative top view of an alternate exemplary locking member used in one embodiment of an exemplary system for locking lift cords used in architectural opening covering systems.
Figure 4B:
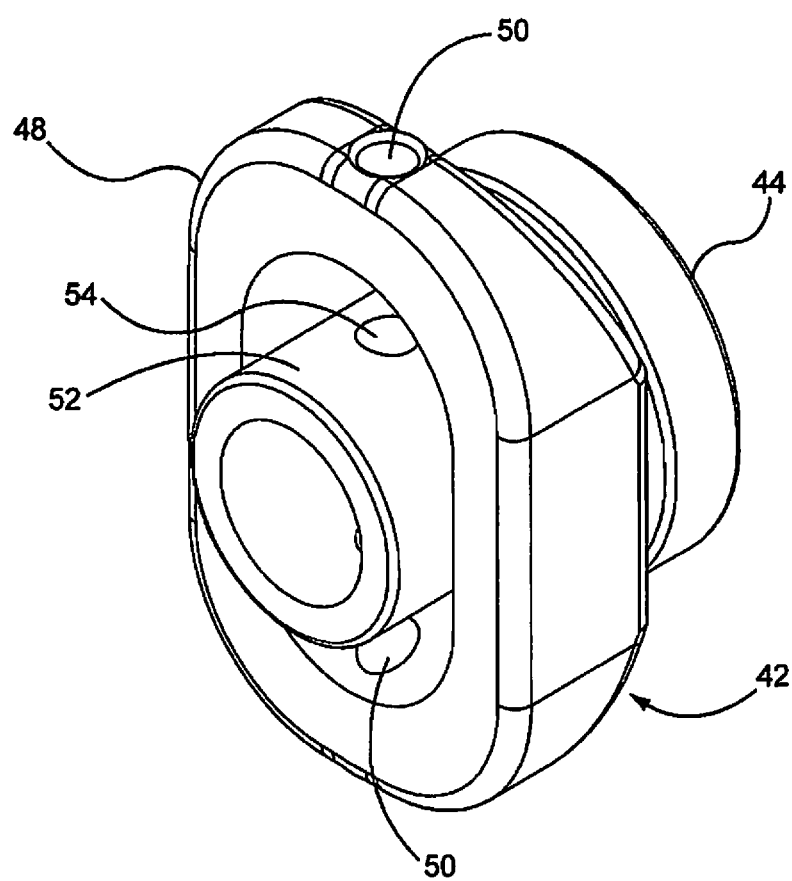
FIG. 4B is a representative front view of the exemplary locking member shown in FIG. 4A.
Figure 5:
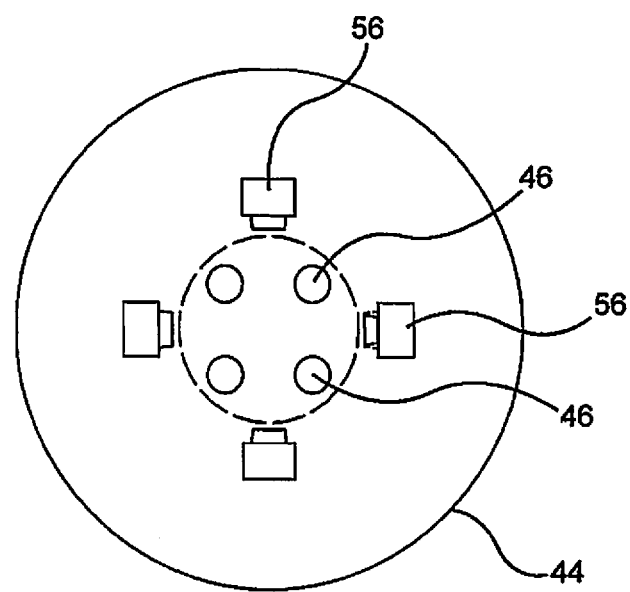
FIG. 5 is a representative top view of a ring base portion of the locking member shown in FIGS. 4A and 4B.
Figure 6A:
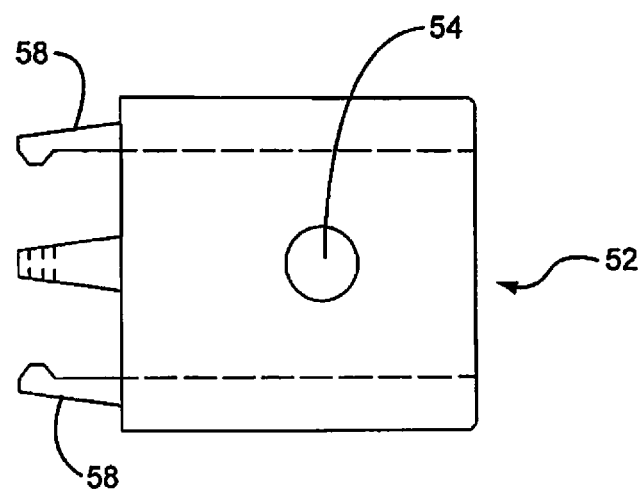
FIG. 6A is a representative side view of a snap-on post portion of the locking member shown in FIGS. 4A and 4B.
Figure 6B:
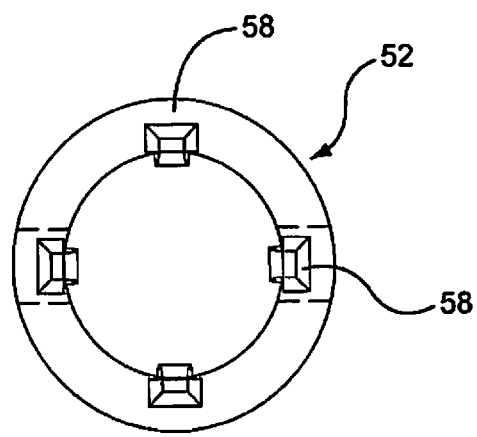
FIG. 6B is a representative bottom view of the snap-on post portion of the locking member shown in FIG. 6A.
Figure 7:
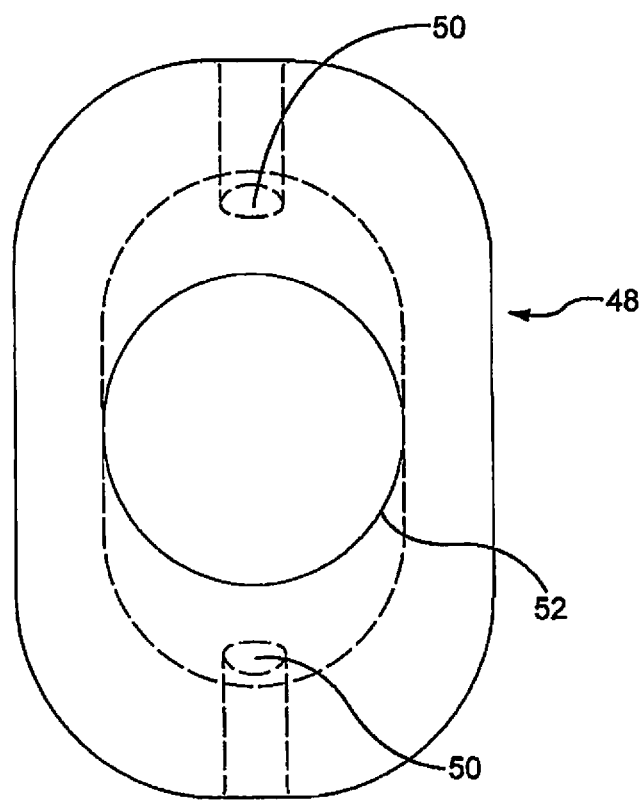
FIG. 7 is a representative top view of the exemplary locking member shown in FIG. 4A.

FIGS. 4A-7 illustrate various views of an alternate exemplary locking member 42. FIG. 4A is a representative top view of an alternate exemplary locking member used in one embodiment of an exemplary system for locking lift cords used in architectural opening covering systems. FIG. 4B is a representative front view of the exemplary locking member shown in FIG. 4A. FIG. 5 is a representative top view of a ring base portion of the locking member shown in FIGS. 4A and 4B. FIG. 6A is a representative side view of a snap-on post portion of the locking member shown in FIGS. 4A and 4B. FIG. 6B is a representative bottom view of the snap-on post portion of the locking member shown in FIG. 6A. FIG. 7 is a representative top view of the exemplary locking member shown in FIG. 4A.

In the embodiment shown in FIGS. 4A-4B, the locking member 42 comprises three parts. The first part of the locking member 42 is a ring base 44 (also referred to as a button). The ring base 44 is attached to an architectural opening covering, such as a shade. In one embodiment, the ring base 44 is used in the place of the guide rings 20 as shown in FIGS. 1A and 1B. The ring base 44 may be directly attached to the shade in one embodiment. The ring base 44 can be attached to the shade in any suitable manner, including but not limited to stitching, glue, adhesive, tacks, and the like. In one embodiment, the ring base has openings 46 to allow the ring base to be attached to the shade or other architectural covering opening.

A second part of the locking member 42 is a rotative lock 48. The rotative lock 48 has openings 50 at each end of the rotative lock 48. The openings 50 are configured to receive a lift cord 18 and allow the lift cord 18 to pass freely through the openings 32 in a first direction.

The rotative lock 48 is configured to rotate about the third part of the locking member 42, a snap-on-post 52 (see FIG. 4B). The snap-on post 52 also has openings 54 that are configured to receive a lift cord 18 and allow the lift cord 18 to pass freely through the openings 32 in a first direction. The snap-on post 52 is configured to snap on to the ring base 44. In one embodiment, as seen in FIG. 5, the ring base 44 may have a plurality of slots 56. In one embodiment, as seen in FIGS. 6A and 6B, the snap-on post 52 has a plurality of prongs 58 disposed on a bottom surface of the snap-on post 52. In one embodiment, the snap-on post 52 may be snapped on to the ring base 44 by placing the prongs 58 of the snap-on post 52 into the slots 56 of the ring base 44. Although the embodiment shown in FIGS. 5, 6A, and 6B show four (4) prongs 58 and four (4) slots 56, any suitable number of prongs 58 and slots 56 may be employed.

The ring base 44 is attached to an architectural covering, like a shade. The snap-on post 52 is then snapped on the ring base 44. As shown in FIG. 7, the rotative lock 48 is then positioned around the snap-on post 52. In one embodiment, the rotative lock is positioned such that the openings 50 of the rotative lock 48 are generally in alignment with the openings 54 of the snap-on post 52. A lift cord 18 can then be inserted through the openings 50 of the rotative lock 48 and through the of the snap-on post 52. The rotative lock 48 will then have the ability to rotate around the snap-on post 52, allowing the lift cord 18 to freely move in a first direction to raise or lower a shade or other architectural opening covering, but when the lift cord 18 is pulled in a second direction, the rotative lock 48 will move such that the lift cord 18 will be pinched between the rotative lock 48 and the snap-on post 52 so that the lift cord 18 is prevented from being pulled away from the covering far enough to create a loop of a certain diameter that might pose a hazard.

Figure 8:
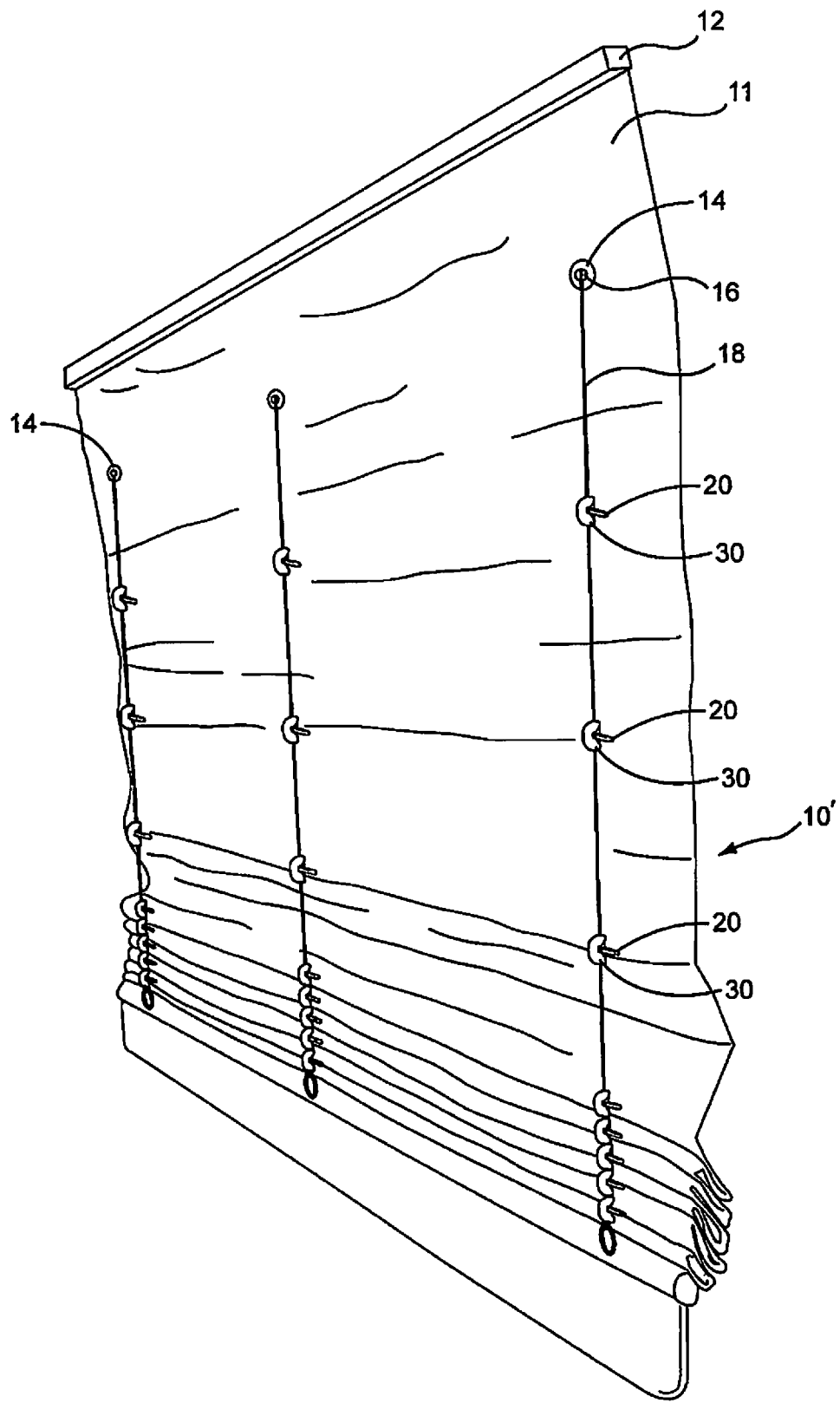
FIG. 8 is a representative back view of an exemplary shade having a plurality of lift cords and a plurality of guide rings in conjunction with exemplary locking members like those illustrated in FIGS. 3A-3C.

FIG. 8 is a representative back view of an exemplary shade having a plurality of lift cords and a plurality of guide rings in conjunction with exemplary locking members like those illustrated in FIGS. 3A-3C. Referring now to FIG. 8, an exemplary system is shown where a plurality of exemplary locking members 30, as shown in FIGS. 3A-3C, are used in an exemplary architectural opening covering system 10', as depicted from the back side. A locking member 30 is used in conjunction with each of the guide rings 20 and one or more lift cords 18. Each of the locking members 30 is configured to engage the guide ring 20 and the lift cord 18. Each locking member 30 is configured to engage the guide ring 20 such that the guide ring 20 fits snugly in the groove 34 of the locking member 30. The lift cord 18 passes through the openings 32 of the locking member 30. The locking member 30 is configured to engage the guide ring 20 and the lift cord 18 in such a way that the locking member has a selective rotative ability, which allows the lift cord 18 to freely move in a first direction to raise or lower a shade or other architectural opening covering. In one embodiment, the first direction is a vertical, or substantially vertical direction, that allows the lift cord 18 to raise or lower the shade 11.

However, when the lift cord 18 is pulled in a second direction, the locking member 30 is configured to rotate about the guide ring 20 to pinch the lift cord 18 between the locking member 30 and the guide ring 20 so that the lift cord 18 is prevented from being pulled away from the covering far enough to create a loop of a certain diameter. In one embodiment, the second direction is any direction other than a vertical, or substantially vertical direction, that allows the lift cord 18 to raise or lower the shade 11. In another embodiment, the second direction is a horizontal, or substantially horizontal direction. In one embodiment, due to the locking members 30 pinching the lift cord 18 when it is pulled in a direction other than the first direction, the locking members 30 will not allow the lift cord 18 to be pulled far enough away from the shade 11 to create a loop of more than seven and one half (7.5) inches in diameter. In another embodiment, due to the locking members 30 pinching the lift cord 18 when it is pulled in a direction other than the first direction, the lift cord 18 will not be capable of being pulled far enough away from the shade 11 to create a loop of more than two to three (2-3) inches in diameter. The locking member 30 thus engages the guide ring 20 in such a way that the locking member 30 has a selective rotative ability, which allows the lift cord 18 to freely move in a first direction to raise or lower the covering (e.g., the shade 11), but will rotate about the guide ring 20 when the lift cord 18 is pulled in a second direction to pinch the lift cord 18 between the locking member 30 and the guide ring 20 so that the lift cord 18 is prevented from being pulled away from the covering far enough to create a loop of a certain diameter that might pose a hazard.

Figure 9:
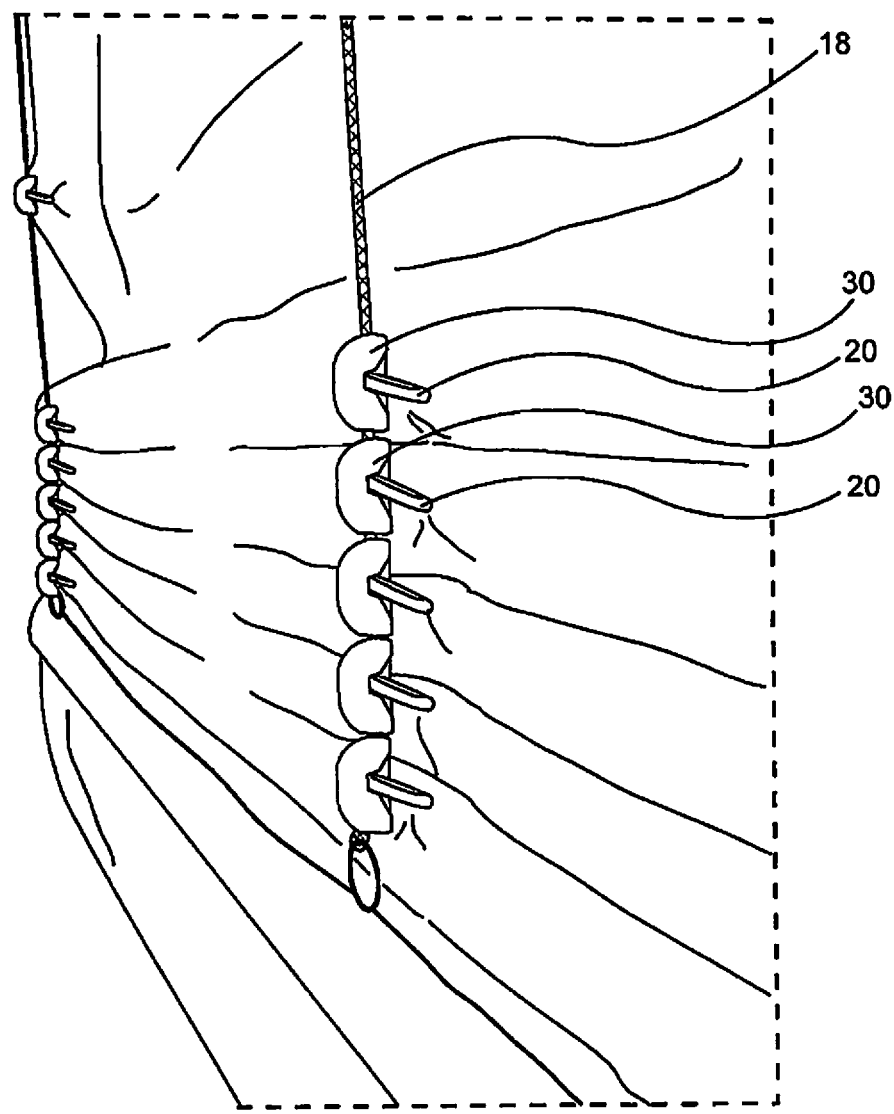
FIG. 9 is a close up representative side view of the exemplary shade of FIG. 8 in a partially lifted position, illustrating an exemplary lift cord, exemplary guide rings, and exemplary locking members.

FIG. 9 is a close up representative side view of the exemplary shade of FIG. 8 in a partially lifted position, illustrating an exemplary lift cord, exemplary guide rings, and exemplary locking members. FIG. 9 is a close up view of the exemplary architectural opening covering system 10' shown in FIG. 8, depicting a lift cord 18 having been pulled up to partially raise the shade 11. As seen in FIG. 9, the guide rings 20 have stacked on top of each other, raising the shade 11 upwardly into folded layers stacked in an accordion fashion. In addition, the locking members 30 have selectively rotated about the guide rings 20 so that the lift cord 18 is prevented from being pulled away from the covering far enough to create a loop of a certain diameter that might pose a hazard.

Figure 10:
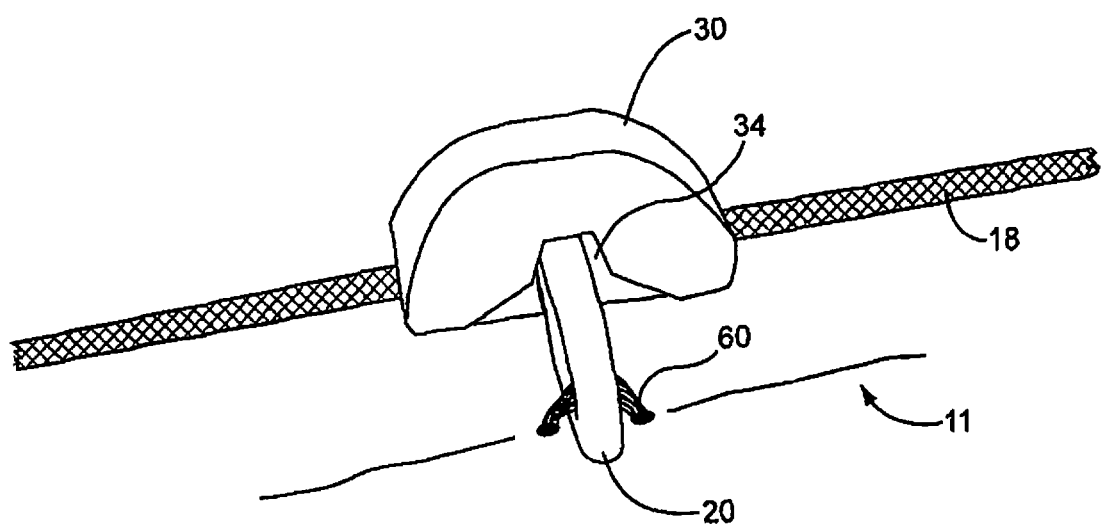
FIG. 10 is a close up representative side view of an exemplary lift cord, an exemplary guide ring, and an exemplary locking member, illustrating the exemplary guide ring attached to the shade and the exemplary locking member in a first position.
Figure 11:
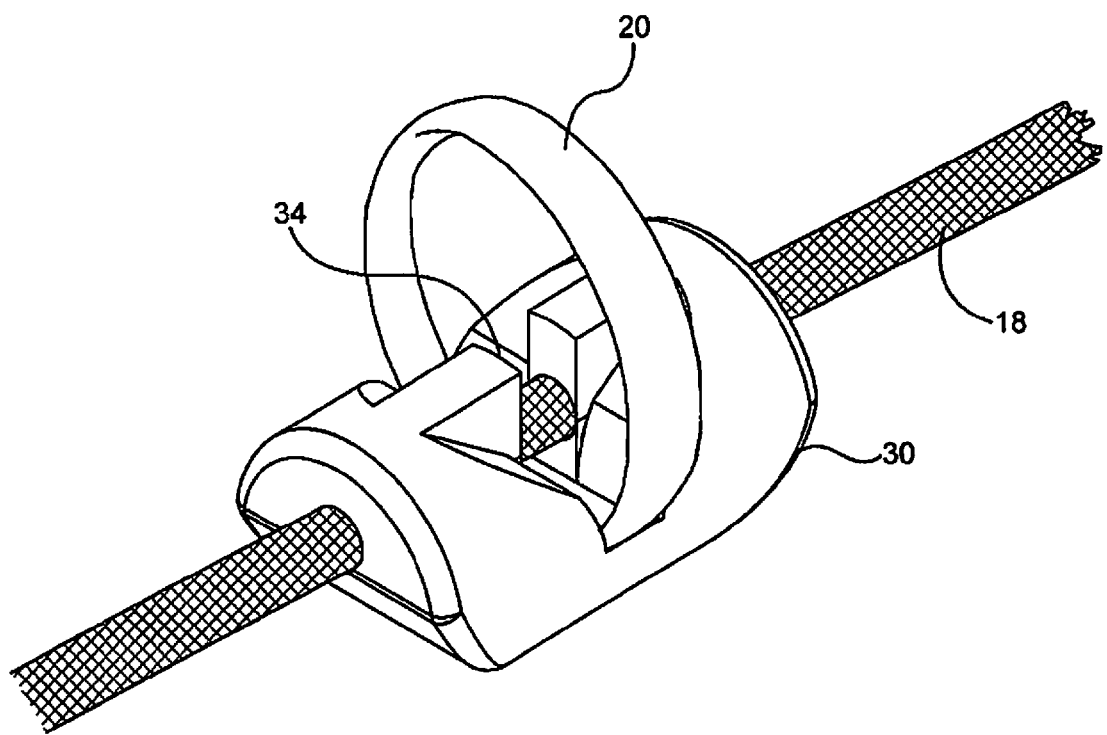
FIG. 11 is a close up representative side view of the exemplary lift cord, the exemplary guide ring, and the exemplary locking member of FIG. 10, illustrating the exemplary locking member having been rotated to a second position.

FIG. 10 is a close up representative side view of an exemplary lift cord, an exemplary guide ring, and an exemplary locking member, illustrating the exemplary guide ring attached to the shade and the exemplary locking member in a first position. FIG. 11 is a close up representative side view of the exemplary lift cord, the exemplary guide ring, and the exemplary locking member of FIG. 10, illustrating the exemplary locking member having been rotated to a second position. FIGS. 10 and 11 are close up views of a single set of a guide ring 20, a locking member 30 having a groove 34, and a lift cord passing through the guide ring 20 and a pair of openings in the locking member 30.

As seen in FIG. 10, the guide ring 20 is attached to a surface of the shade 11. In this embodiment, the guide ring 20 is attached via stitching 60. FIG. 10 shows the locking member 30 in a first position, i.e., on the top of the guide ring 30. The guide ring 20 is positioned within the groove 34 of the locking member 30 such that the locking member 30 can rotate around a diameter of the guide ring 20 about an axis of the lift cord 18.

FIG. 11 shows the locking member 30 in a second position, i.e., on the bottom of the guide ring 30. Compared to the first position shown in FIG. 10, the locking member 30 has rotated around a diameter of the guide ring 20 about an axis of the lift cord 18. It is noted that the locking member 30 can only get to the position shown in FIG. 11 if the stitching 60 shown in FIG. 10 and the size of the guide ring 20 and the locking member 30 allow the locking member 30 to rotate that far. In other embodiments, the locking member 30 may only to be able to rotate part of the way towards the second position shown in FIG. 11.

Figure 12:
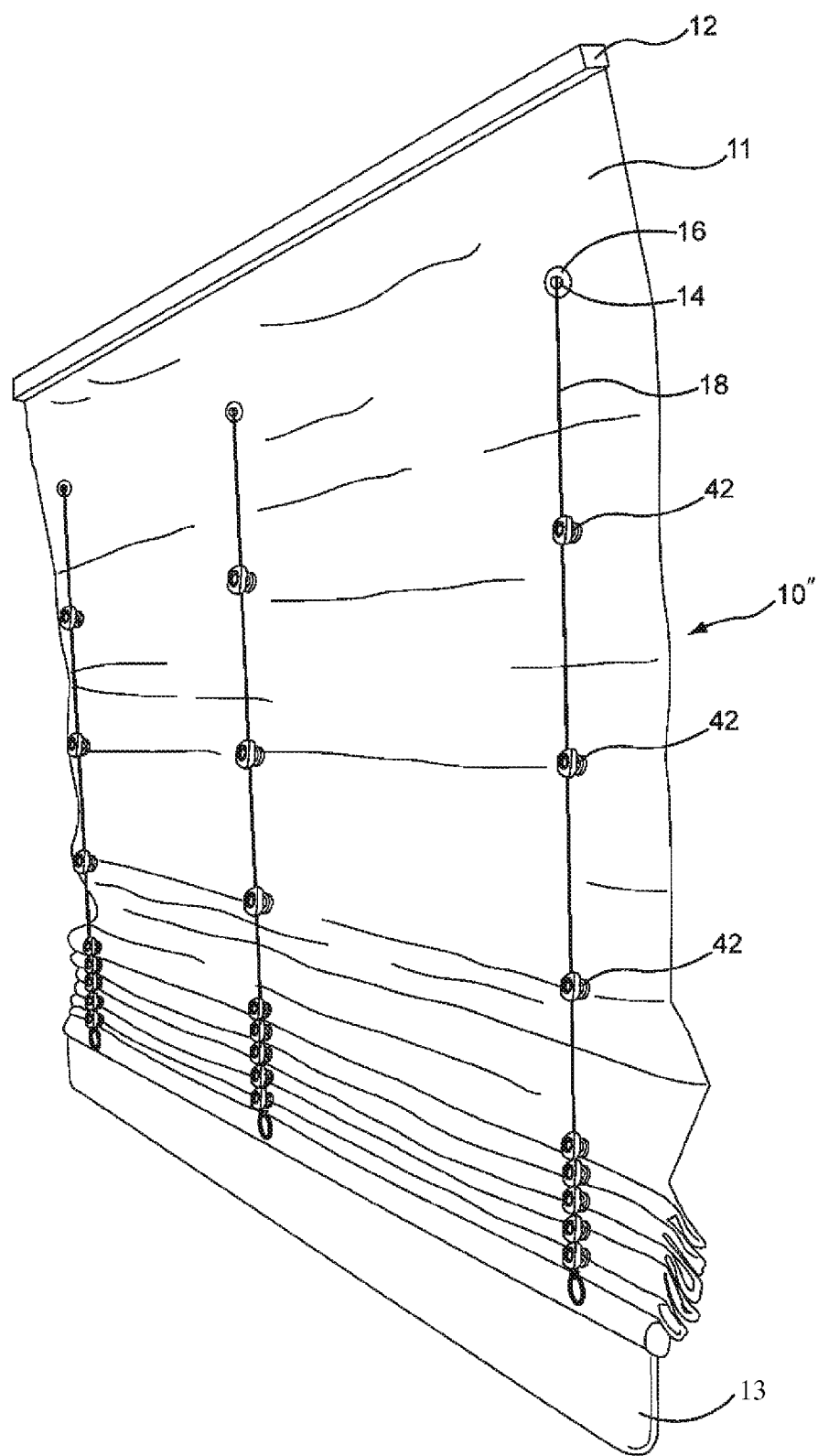
FIG. 12 is a representative back view of an exemplary shade having a plurality of lift cords and a plurality of guide rings in conjunction with exemplary locking members like those illustrated in FIGS. 4A-7.

FIG. 12 is a representative back view of an exemplary shade having a plurality of lift cords and a plurality of guide rings in conjunction with exemplary locking members like those illustrated in FIGS. 4A-7. Referring now to FIG. 12, an exemplary system is shown where a plurality of exemplary locking members 30, as shown in FIGS. 4A-7, are used in an exemplary architectural opening covering system 10", as depicted from the back side. In place of the guide rings 20 shown in the embodiment of FIG. 8, a plurality of the locking members 42 are used. In particular, a number of ring bases 44 are attached to an architectural opening covering, such as a shade 11. In one embodiment, the ring base 44 is used in the place of the guide rings 20 as shown in FIGS. 1A and 1B. The ring base 44 may be directly attached to the shade 11, as described above.

A snap-on post 52, as described above with references to FIGS. 4B, 6A, and 6B, is then snapped on to the ring base 44 as described above. The snap-on post 52 also has openings 54 that are configured to receive a lift cord 18 and allow the lift cord 18 to pass freely through the openings 32 in a first direction.

A rotative lock 48 as described above in FIGS. 4A, 4B, and 7 is then positioned around the snap-on post 52. The rotative lock 48 has openings 50 at each end of the rotative lock 48. The openings 50 are configured to receive a lift cord 18 and allow the lift cord 18 to pass freely through the openings 32 in a first direction. In one embodiment, the rotative lock is positioned such that the openings 50 of the rotative lock 48 are generally in alignment with the openings 54 of the snap-on post 52. A lift cord 18 can then be inserted through the openings 50 of the rotative lock 48 and through the of the snap-on post 52. The rotative lock 48 will then have the ability to rotate around the snap-on post 52, allowing the lift cord 18 to freely move in a first direction to raise or lower a shade or other architectural opening covering, but when the lift cord 18 is pulled in a second direction, the rotative lock 48 will move such that the lift cord 18 will be pinched between the rotative lock 48 and the snap-on post 52 so that the lift cord 18 is prevented from being pulled away from the covering far enough to create a loop of a certain diameter that might pose a hazard.

The rotative lock 48 has a rotative ability, which allows the lift cord 18 to freely move in a first direction to raise or lower a shade or other architectural opening covering. In one embodiment, the first direction is a vertical, or substantially vertical direction, that allows the lift cord 18 to raise or lower the shade 11. However, when the lift cord 18 is pulled in a second direction, the rotative lock 48 is configured to rotate about the snap-on post 52 to pinch the lift cord 18 between the rotative lock 48 and the snap-on post 52 so that the lift cord 18 is prevented from being pulled away from the covering far enough to create a loop of a certain diameter. In one embodiment, the second direction is any direction other than a vertical, or substantially vertical direction, that allows the lift cord 18 to raise or lower the shade 11. In another embodiment, the second direction is a horizontal, or substantially horizontal direction. In one embodiment, due to the lift cord 18 being pinched between the rotative lock 48 and the snap-on post 52 when it is pulled in a direction other than the first direction, the rotative lock 48 will not allow the lift cord 18 to be pulled far enough away from the shade 11 to create a loop of more than approximately seven and one half (7.5) inches in diameter. In another embodiment, due to the lift cord 18 being pinched between the rotative lock 48 and the snap-on post 52 when it is pulled in a direction other than the first direction, the lift cord 18 will not be capable of being pulled far enough away from the shade 11 to create a loop of more than approximately two to three (2-3) inches in diameter. In one embodiment, the loop should be smaller than the listed diameters when approximately ten (10 pounds) of push force or approximately five (5) pounds of pull force is exerted on the lift cord.

Figure 13:
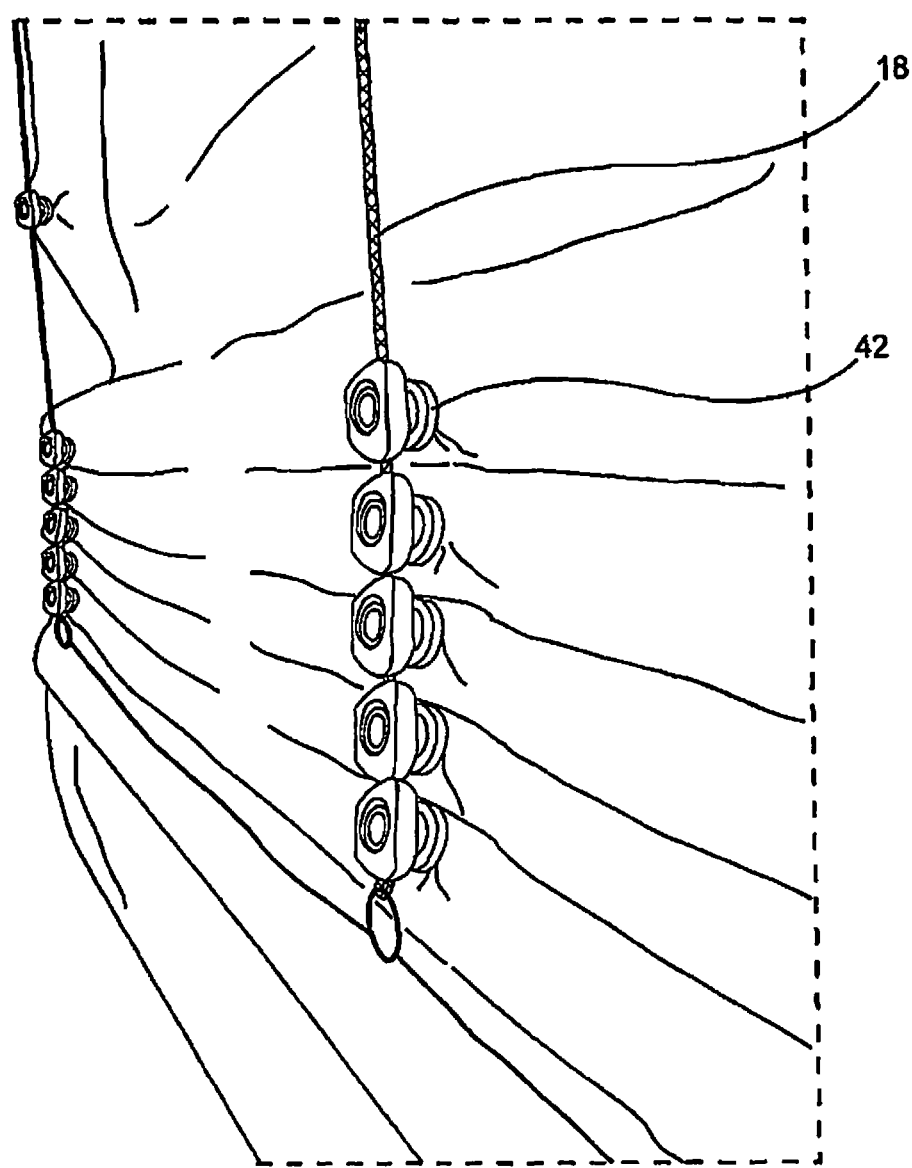
FIG. 13 is a close up representative side view of the exemplary shade of FIG. 12 in a partially lifted position, illustrating exemplary locking members like those illustrated in FIGS. 4A-7 attached to a surface of the shade and an exemplary lift cord running through the exemplary locking members.

FIG. 13 is a close up representative side view of the exemplary shade of FIG. 12 in a partially lifted position, illustrating exemplary locking members like those illustrated in FIGS. 4A-7 attached to a surface of the shade and an exemplary lift cord running through the exemplary locking members. FIG. 13 is a close up view of the exemplary architectural opening covering system 10' shown in FIG. 8, depicting a lift cord 18 having been pulled up to partially raise the shade 11. As seen in FIG. 9, the locking members 42 have stacked in an accordion fashion, raising the shade 11 upwardly into folded layers. In addition, the rotative lock 48 of each of the locking members 42 have selectively rotated about the snap-on post 52 of each of the locking members 42 so that the lift cord 18 is prevented from being pulled away from the covering far enough to create a loop of a certain diameter that might pose a hazard.

Figure 14:
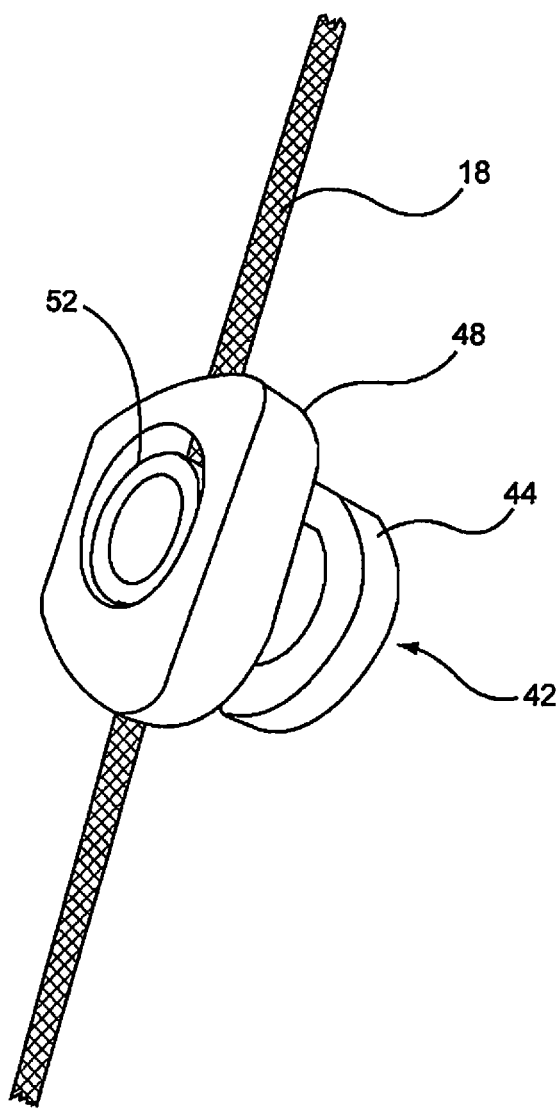
FIG. 14 is a close up representative side view of an exemplary locking member like those illustrated in FIGS. 4A-7 and an exemplary lift cord running through the exemplary locking member.

FIG. 14 is a close up representative side view of an exemplary locking member like those illustrated in FIGS. 4A-7 and an exemplary lift cord running through the exemplary locking member. Each locking member 42 has a ring base 44, a snap-on post 52, and a rotative lock 48. The ring base 44 of the locking member 42 is attached to a surface of the shade 11. The lift cord 18 passes through a pair of openings in the rotative lock 48 and through a matching set of openings in the snap-on post 52. The rotative lock 48 is positioned around the snap-on post 52 such that the rotative lock 48 can rotate around a diameter of the snap-on post 48 to pinch the lift cord 18 when the lift cord 48 is pulled in a second direction that is any direction other than a first direction used to raise or lower the shade 11

Although the embodiments disclosed herein have been illustratively described with respect to various embodiments for window openings or other architectural openings, it will be recognized that the cover assembly can be advantageously utilized as a covering for any indoor or outdoor passage, portal, gate opening or the like. For example, the cover assembly in other embodiments can be used as a closure for a tent or cabana or a decorative screen or partition that may be deployed with an associated frame, to provide a freestanding room divider, privacy screen, sun-blocking structure or the like.

While the embodiments disclosed herein have been described herein in reference to specific aspects, features and illustrative embodiments, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Correspondingly, the invention as hereinafter claimed is intended to be broadly construed and interpreted, as including all such variations, modifications and alternative embodiments, within its spirit and scope.

Those skilled in the art will recognize improvements and modifications to the preferred embodiments of the present disclosure. All such improvements and modifications are considered within the scope of the concepts disclosed herein and the claims that follow.

What is claimed is:

1. An apparatus for locking a lift cord designed to lift coverings for architectural openings, comprising:
   a ring base attached to a covering for an architectural opening, the ring base having a plurality of slots;
   a snap-on post having at least one opening and a plurality of prongs disposed on a surface of the snap-on post, wherein the at least one opening is configured to receive the lift cord and wherein each of the plurality of prongs is configured to fit into a corresponding one of the plurality of slots of the ring base such that the snap-on post is configured to be snapped onto the ring base; and
   a rotative lock member having at least one opening configured to receive the lift cord, wherein the rotative lock member is configured to be positioned around the snap-on post such that the at least one opening of the rotative lock member is aligned with the at least one opening of the snap-on post to allow the lift cord to pass through the at least one opening of both the snap-on post and the rotative lock member,
   wherein the rotative lock member is configured to allow the lift cord to freely move in and out of the at least one opening of both the snap-on post and the rotative lock member in a first direction to raise or lower the covering, and the rotative lock member moves about the snap-on post when the lift cord is pulled in a second direction that is different from the first direction to pinch the lift cord between the rotative lock member and the snap-on post to prevent the lift cord from being pulled away from the covering.

2. The apparatus of claim 1, wherein the first direction is substantially vertical and the second direction is a direction other than substantially vertical.

3. The apparatus of claim 1, wherein the rotative lock member prevents the lift cord from being pulled away from the covering to create a loop of more than approximately 7.5 inches.

4. The apparatus of claim 1, wherein the rotative lock member prevents the lift cord from being pulled away from the covering to create a loop of more than approximately 12 inches.

5. The apparatus of claim 1, wherein the rotative lock member prevents the lift cord from being pulled away from the covering to create a loop of more than approximately two to three inches.

6. The apparatus of claim 1, wherein the covering is a shade.

7. The apparatus of claim 1, further comprising a covering for an architectural opening that is configured to be raised or lowered by the lift cord.

8. The apparatus of claim 1, wherein the rotative lock member and the snap-on post are configured to maintain contact with the lift cord while the lift cord is being pulled in the second direction.

9. A method for locking a lift cord designed to lift coverings for architectural openings, comprising:
   providing a covering for an architectural opening that is configured to be raised or lowered by at least one lift cord;
   attaching a ring base having a plurality of slots to the covering for an architectural opening;
   snapping onto the ring base a snap-on post having at least one opening and a plurality of prongs disposed on a surface of the snap-on post, the snapping comprising fitting each of the plurality of prongs into a corresponding one of the plurality of slots of the ring base, wherein the at least one opening is configured to receive the at least one lift cord; and
   positioning a rotative lock member around the snap-on post, wherein the rotative lock member comprises at least one opening configured to receive the at least lift cord, and wherein the at least one opening of the rotative lock member is aligned with the at least one opening of the snap-on post to allow the at least one lift cord to pass through the at least one opening of both the snap-on post and the rotative lock member, wherein the rotative lock member is configured to allow the at least one lift cord to freely move in and out of the at least one opening of both the snap-on post and the rotative lock member in a first direction to raise or lower the covering, and the rotative lock member moves about the snap-on post when the at least one lift cord is pulled in a second direction that is different than the first direction to pinch the at least one lift cord between the rotative lock member and the snap-on post to prevent the at least one lift cord from being pulled away from the covering.

10. The method of claim 9, wherein the first direction is substantially vertical and the second direction is a direction other than substantially vertical.

11. The method of claim 9, wherein the rotative lock member prevents the lift cord from being pulled away from the covering to create a loop of more than approximately 7.5 inches.

12. The method of claim 9, wherein the rotative lock member prevents the lift cord from being pulled away from the covering to create a loop of more than approximately 12 inches.

13. The method of claim 9, wherein the rotative lock member prevents the lift cord from being pulled away from the covering to create a loop of more than approximately two to three inches.

14. The method of claim 9, wherein the covering is a shade.

15. The method of claim 9, wherein the rotative lock member and the snap-on post maintain contact with the lift cord while the lift cord is being pulled in the second direction.

* * * * *